United States Patent
Winkelkoetter

(10) Patent No.: US 9,677,034 B2
(45) Date of Patent: Jun. 13, 2017

(54) DEGREASING MIXTURE COMPRISING A PHYLLOSILICATE/TECTOSILICATE MIXTURE

(71) Applicant: EUROTEC Vertriebsgesellschaft m.b.H, Lehnin (DE)

(72) Inventor: Martina Winkelkoetter, Wessling (DE)

(73) Assignee: EUROTEC VERTRIEBSGESELLSCHAFT mbH, Lehnin (DE)

( * ) Notice: Subject to any disclaimer, the term of this patent is extended or adjusted under 35 U.S.C. 154(b) by 116 days.

(21) Appl. No.: 14/440,490

(22) PCT Filed: Nov. 20, 2013

(86) PCT No.: PCT/EP2013/074314
§ 371 (c)(1),
(2) Date: May 21, 2015

(87) PCT Pub. No.: WO2014/079899
PCT Pub. Date: May 30, 2014

(65) Prior Publication Data
US 2015/0284666 A1    Oct. 8, 2015

(30) Foreign Application Priority Data
Nov. 21, 2012  (DE) ............... 20 2012 104 510 U

(51) Int. Cl.

| | | |
|---|---|---|
| *C11D 7/14* | (2006.01) | |
| *C11D 3/08* | (2006.01) | |
| *B01J 20/10* | (2006.01) | |
| *C23G 5/00* | (2006.01) | |
| *C11D 7/20* | (2006.01) | |
| *C11D 3/12* | (2006.01) | |
| *C11D 7/02* | (2006.01) | |
| *C11D 17/00* | (2006.01) | |
| *C11D 17/04* | (2006.01) | |
| *D01D 5/24* | (2006.01) | |
| *D01F 11/00* | (2006.01) | |
| *B01J 20/12* | (2006.01) | |
| *B01J 20/20* | (2006.01) | |
| *B01J 20/28* | (2006.01) | |
| *B05C 17/02* | (2006.01) | |
| *C11D 17/06* | (2006.01) | |

(52) U.S. Cl.
CPC ............. *C11D 7/20* (2013.01); *B01J 20/10* (2013.01); *B01J 20/12* (2013.01); *B01J 20/20* (2013.01); *B01J 20/28004* (2013.01); *B05C 17/02* (2013.01); *C11D 3/126* (2013.01); *C11D 3/128* (2013.01); *C11D 3/1253* (2013.01); *C11D 7/02* (2013.01); *C11D 17/00* (2013.01); *C11D 17/041* (2013.01); *C11D 17/049* (2013.01); *C11D 17/06* (2013.01); *C23G 5/00* (2013.01); *D01D 5/24* (2013.01); *D01F 11/00* (2013.01); *B01J 2220/42* (2013.01)

(58) Field of Classification Search
CPC .............. C23G 5/00; B01J 20/10; C11D 7/02
See application file for complete search history.

(56) References Cited

U.S. PATENT DOCUMENTS

| | | | | |
|---|---|---|---|---|
| 4,276,205 A * | 6/1981 | Ferry | ............... | C11D 3/3707 510/341 |
| 5,063,187 A * | 11/1991 | Burgfels | ............... | B01J 29/40 502/62 |
| 5,332,513 A * | 7/1994 | Doms | ............... | C11D 1/72 510/306 |
| 5,719,098 A * | 2/1998 | Hahn | ............... | A01K 1/0152 502/407 |
| 2005/0003996 A1 * | 1/2005 | Santos | ............... | A61L 9/01 510/520 |
| 2005/0037937 A1 | 2/2005 | Pace | | |
| 2009/0305871 A1 | 12/2009 | Perera | | |
| 2012/0260860 A1 * | 10/2012 | Drief | ............... | A01K 1/0154 119/173 |

FOREIGN PATENT DOCUMENTS

| | | |
|---|---|---|
| DE | 102004007809 A | 9/2005 |
| DE | 102007020552 A | 1/2008 |
| DE | 202004021666 U | 3/2010 |
| EP | 1757677     * | 8/2005 |
| EP | 1757677 B | 11/2011 |

* cited by examiner

*Primary Examiner* — Charles Boyer
(74) *Attorney, Agent, or Firm* — Andrew Wilford

(57) ABSTRACT

The invention relates to a degreasing mixture for removing grease, oils, or similar hydrophobic components from a surface of a substrate. The degreasing mixture contains a solvent-free silicate mixture as the main component. The silicate mixture contains granules of phyllosilicate and granules of tectosilicate. Up to 90% by mass of the granules contained in the silicate mixture has a particle size of less than 60 μm, and the maximum particle size of the granules of phyllosilicate is smaller than the maximum particle size of the granules of tectosilicate.

12 Claims, 2 Drawing Sheets

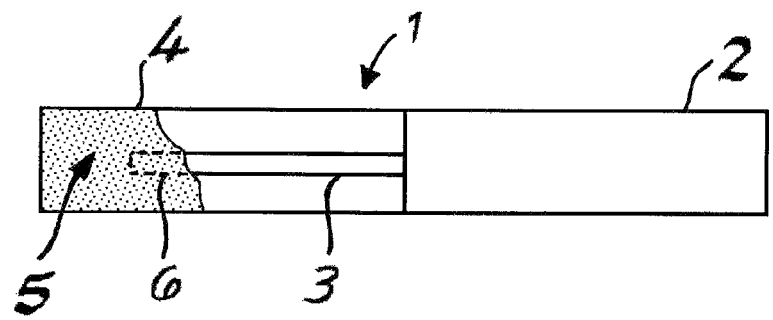
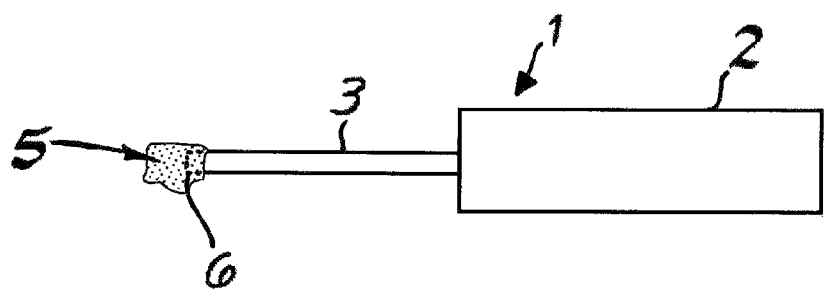
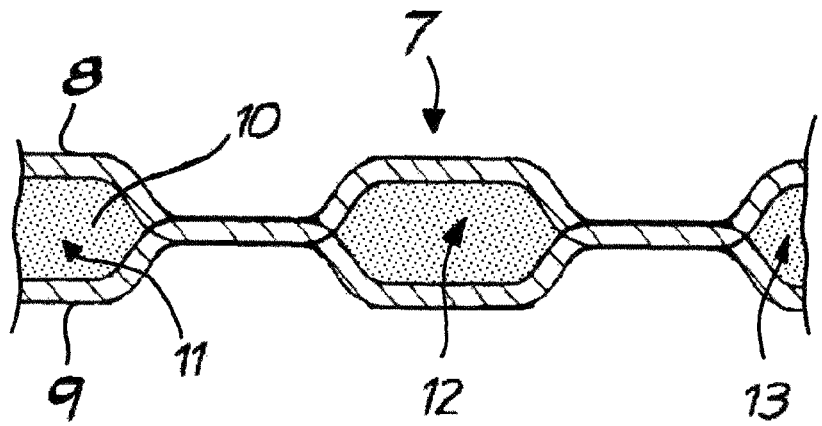

DEGREASING MIXTURE COMPRISING A PHYLLOSILICATE/TECTOSILICATE MIXTURE

CROSS REFERENCE TO RELATED APPLICATIONS

This application is the US-national stage of PCT application PCT/EP2013/074314 filed 20 Nov. 2013 and claiming the priority of German patent application 202012104510.9 itself filed 21 Nov. 2012.

FIELD OF THE INVENTION

The invention relates to a degreasing mixture for removing oils, grease, or similar hydrophobic components from a surface of a substrate. The substrate is preferably a metal or a plastic surface, and combinations thereof are also naturally included.

BACKGROUND OF THE INVENTION

Degreasing mixtures of the above-mentioned type are basically known from practical use. In addition, reference is made to EP 1 757 677 that refers to a dry powder as the degreasing mixture. The dry powder itself can be formed as a mixture of a tectosilicate and a phyllosilicate.

A similar approach is taken according to US 2005/037937 that describes a method for removing oily contaminants on surfaces. To this end, a porous dry powder is sprinkled on the relevant surface. This powder is removed from the surface after adsorption of the hydrophobic components. Further details remain open, however.

OBJECT OF THE INVENTION

The object of the invention is to provide a degreasing mixture that is characterized by a high absorption capacity for grease, oils, or the like, and that can be easily applied to a substrate surface and has high efficacy.

SUMMARY OF THE INVENTION

In order to attain this object, the invention teaches a degreasing mixture that has proven effective to apply the granular degreasing mixture, for example by nozzles, to a surface to be degreased. In order to improve the cleaning effect of the degreasing mixture, it is also known from EP 1 757 677 to apply the degreasing mixture to the surface to be cleaned by mechanical action, for example by brushes. In addition, reference is made to the utility model DE 20 2004 021 666. That is, the degreasing mixture can be applied entirely by being blown on, the application can be carried out by electrostatic pistols and devices or the like, as is known in the context of powder coating, for example. In addition, the degreasing mixture can be applied by pressing. When applied by nozzles, the degreasing mixture is generally fluidized. Overall, the degreasing mixture according to the invention makes it possible to improve performance as compared to degreasing mixtures known from practical use.

In this context, the invention is clearly based on the surprising discovery that controlling the particle size for the silicate mixture results in particularly effective removal of the hydrophobic components from the surface of the particular substrate. In fact, the silicate mixture is the main component of the degreasing mixture according to the invention, and, in this case, the degreasing mixture preferably contains 90% by mass and preferably at least 95% by mass of the silicate mixture. Moreover, an additive or a plurality of additives can be added to the silicate mixture in order to form the degreasing mixture. These additives are typically present in the degreasing mixture in a quantity of 0 to 10% by mass and preferably 0 to 5% by mass.

In any case, the silicate mixture is the main component, i.e. is present in the degreasing mixture in a quantity greater than 50% by mass. In combination with the additional fact that up to 90% by mass of the granules contained in the silicate mixture have a particle size of less than 60 µm, one therefore arrives at a solvent-free degreasing mixture in which the majority of the granules are designed to have a particle size smaller than 60 µm. It is thereby possible to particularly effectively remove, for example grease or also oils and, in particular, oil films from substrates such as metal or plastic surfaces. This also applies for silicones and other separating agents.

The reason for this is that such oil or grease films usually have a layer thickness of up to 0.15 µm, based on a typical oil stain having a coating amount of 1.2 g/m$^2$ and a lightweight mineral oil having carbon chains of different lengths (see for example, DE 10 2007 020 552, example 1). The particle size is therefore more than 100-fold the layer thickness, and therefore the layer can be broken up even with a small amount of mechanical energy of the individual granules. This mechanical energy can be applied, for example by spraying, as described above, or by brushes.

At the same time, the above-described size ratio between the layer thickness of such oil or grease films and the particle size of the degreasing mixture according to the invention promotes the insertion of the oil or grease into or to the individual granules by typical physisorption. Van der Waals forces are generally used in this case. In this context, the adsorbed oil or grease molecules are bonded on or in the granule by physical forces. In any case, the above-described size ratio, in which the particle size is more than 100-fold the layer thickness of the oil or grease film to be removed, promotes not only the breaking up and dissolution of the relevant film, but also the deposition or insertion of the resultant oil or grease droplets onto or into the particular granules and/or in the interior thereof.

In addition, phyllosilicates as well as tectosilicates have a porous surface, as is known. In this context, pores are actually observed that typically have diameters in the nanometer range and, therefore, can particularly effectively accommodate, in the interior thereof, the oil droplets released from the layer, which is basically known (see EP 1 757 677 and US 2005/037937).

Another advantage and special feature has proven to be that, within the scope of the invention, the maximum particle size of the granules of phyllosilicate is set to be smaller than the maximum particle size of the granules of tectosilicate and is associated with particular and surprising effects. In fact, this dimensioning rule ensures, in a manner similar to that of the previously discussed limitation of the particle size of the majority of granules to less than 60 µm, that a high absorbency capacity for grease, oils, and similar hydrophobic components, in combination with a particular cleaning effect, is observed. The invention is based on the further discovery that tectosilicates usually exhibit no change in lattice structure when substances are inserted. This distinguishes them from the phyllosilicates, the layer separation of which typically changes when hydrophobic components are inserted, which causes these phyllosilicates to swell. The invention takes this fact into account in that the maximum particle size of the granules of phyllosilicate is set to be smaller than the maximum particle size of the granules of tectosilicate.

It can therefore be assumed that, after entry of the hydrophobic components into the granules of phyllosilicates and the associated swelling that is accompanied by a change in the layer separation of the granules of phyllosilicates, particle sizes are observed that are comparable to those of the tectosilicates that exhibit practically no change in the lattice structure during such adsorption. The maximum particle size of the granules of tectosilicate is typically approximately 1.5-fold to 2.0-fold the maximum particle size of the granules of phyllosilicate. As a result, the invention accounts for the fact that the granules of phyllosilicates that are used swell when the hydrophobic components are inserted. In fact, changes of the granules of phyllosilicate of up to two-fold are observed in this case.

As a result, in all, after insertion of the hydrophobic components, it must be assumed that there will be a homogeneous distribution of the particle size of the granules in the silicate mixture that simplifies disposal or further processing. The reason for this is that such a homogeneous distribution of the particle size of the granules can not only be easily separated out, but can also be recycled, as necessary. These are the main advantages.

The granule or particle size of the granules contained in the silicate mixture can basically be determined by sieving. A set of increasingly finer sieves is used in this case. The particle size distribution or also the frequency distribution is determined such that the classified equivalent diameter of the particular granule or the particle size thereof is presented relative to the percentage in percent by mass of the granules. The oil uptake of the degreasing mixture according to the invention, overall, is in the range of 20 g to 40 g oil/100 g degreasing mixture.

Preferably, 60% by mass of the granules of phyllosilicate and/or the granules of tectosilicate has a size of 5 μm to 55 μm. Furthermore, the substrate is typically a metal and/or a plastic and/or a textile surface. In this context, the degreasing mixture is advantageously used to remove grease and oils from the surfaces and/or plastic and/or textile surfaces. It has been demonstrated that the granules of tectosilicate and/or the granules of phyllosilicate each have a porous surface. Particularly preferably, the granules of phyllosilicate and/or the granules of tectosilicate mainly or substantially have micropores and mesopores. Micropores are pores that preferably have a diameter of up to 2 nm. Within the scope of the invention, mesopores have a diameter of, for example 2 nm to 50 nm. According to one embodiment, the granules of phyllosilicate and/or the granules of tectosilicate are activated, for example by ion exchange with organic and/or inorganic ions and complexes. According to a preferred embodiment, the granules of phyllosilicate and/or the granules of tectosilicate are activated by treatment with acid, for example sulphuric hydrochloric, or organic acids.

That is, the phyllosilicate or tectosilicate in question can be used as a natural product or as a treated product as described above. It is also possible and conceivable to adjust the relevant product in terms of the desired particle size by sieving and/or grinding. It is recommended that the pore distribution and/or size and/or surface characteristics of the pores can be set by activation of the granules of phyllosilicate and/or the granules of tectosilicate. Within the scope of the invention, "surface characteristics" refers to the organophilic or hydrophilic nature of an inner surface of the pores. According to one embodiment, the pores of the granules of tectosilicate and/or phyllosilicate can be adapted to the particles to be absorbed, by the activation.

Advantageously, the granules of phyllosilicate have a maximum particle size of 25 μm to 65 μm. Preferably, the maximum particle size of the granules of phyllosilicate is less than or equal to 60 μm. In a preferred embodiment, the granules of tectosilicate have a maximum particle size of 55 μm to 85 μm. It is recommended that the maximum particle size of the granules of tectosilicate is less than or equal to 63 μm. The particle size can be determined by sieving, for example. As an option, the particle size can also be adjusted by grinding.

It lies within the scope of the invention that up to 90% by mass of the granules contained in the silicate mixture have a particle size of less than 60 μm. Within the scope of the invention, "% by mass" refers to a quotient in which the divisor is the mass of the granules contained in the silicate mixture and the dividend is the mass of the granules of the silicate mixture having a certain size. It is recommended that up to 50% by mass of the granules contained in the silicate mixture has a particle size of less than 25 μm. Within the scope of the invention, "granules" refers to the granules of the tectosilicate and/or the granules of phyllosilicate. Particularly preferably, approximately 10% by mass of the granules of phyllosilicate and/or tectosilicate contained in the silicate mixture has a particle size of less than 5 μm and, preferably, less than 3 μm.

In a first embodiment of the silicate mixture, 99% by mass of the granules of the silicate mixture have a particle size of less than 52 μm. Preferably, in the first embodiment, 95% by mass of the granules have a particle size of less than 47 μm. It has been demonstrated that 97% by mass of the granules of the silicate mixture in the first embodiment have a particle size of less than 43 μm. Preferably, 90% by mass of the particles of the silicate mixture in the first embodiment have a size of less than 31 μm. In a second embodiment, 90% by mass of the granules contained in the silicate mixture have a size of less than 60 μm. Preferably, in the second embodiment, 50% by mass of the granules of the silicate mixture have a size of less than 21 μm. Particularly preferably, more than half of the tectosilicate granules contained in the silicate mixture have a diameter of more than 20 μm.

It lies within the scope of the invention that the phyllosilicate content of the silicate mixture is greater, preferably greater by the factor 1.1 to 2, than the tectosilicate content of the silicate mixture. This means that the phyllosilicate content of the silicate mixture is 1.1 times to 2 times the tectosilicate content of the silicate mixture. This dimensioning rule accounts for the fact that phyllosilicates are usually less expensive than tectosilicates. The desired properties of the silicate mixture are retained nonetheless.

It is recommended that the silicate mixture contains 20 to 60% by mass and preferably 30 to 50% by mass of the granules of tectosilicate. Particularly preferably, the silicate mixture contains 40 to 80% by mass and preferably 50 to 70% by mass of the phyllosilicate. For example, the silicate mixture contains approximately 50% by mass of the phyllosilicate. It is possible that the silicate mixture contains approximately 40% by mass of the granules of tectosilicate.

It is recommended that the granules of tectosilicate and/or the granules of phyllosilicate are each preferably an aluminosilicate. Preferably, the phyllosilicate is a preferably three-layer phyllosilicate that is capable of swelling. It is recommended that at least one of the components selected from the group of zeolites is contained in the silicate mixture, as the granules of tectosilicate. The tectosilicate has a pore system having a high specific surface area, and so there are numerous possibilities for the adsorption of hydrophobic and/or hydrophilic components. For example, the tectosilicate is a naturally occurring clinoptilolite and/or a chabazite.

According to one embodiment, the phyllosilicate is at least one phyllosilicate selected from the group consisting of bentonite, kaolinite, palygorskite, illite, mica, chlorite, pyrophyllite, imogolite, and montmorillonite. It is recommended that the phyllosilicate is a smectic clay mineral. Particularly preferably, the phyllosilicate is a calcium bentonite. Advantageously, the bentonite is activated, for example with sodium carbonate. The relevant clay mineral or phyllosilicate can be coated with calcium, magnesium, and/or sodium.

It is recommended that the degreasing mixture contains at least one granular adsorbing agent as an additive, this adsorbing agent being selected from the group consisting of activated carbon and talcum. According to one embodiment, the adsorbing agent has a particle size, for example of less than 100 μm, preferably less than 80 μm, and preferably less than 60 μm. Particularly preferably, the adsorbing agent has a particle size of less than 45 μm.

It is possible that the degreasing mixture contains up to 10% by mass, preferably 1 to 10% by mass, preferably 1 to 8% by mass, and preferably 0.5 to 5% by mass of the granular adsorbing agent. The remainder (approximately 0.5% by mass to 1% by mass) can be impurities. Particularly preferably, the degreasing mixture has at least 90% by mass and preferably at least 95% by mass of the silicate mixture. It is recommended that the degreasing mixture is substantially composed of the silicate mixture or the silicate mixture and the adsorbing agent.

It is possible that the degreasing mixture contains at least one additive selected from the group consisting of quartz, sand, glass beads, corn meal, nutshells, steel beads, corundum, microfiber component products as well as fleece, felts, and rubber products. Preferably, a mixture of the degreasing mixture and the additive is used for the sandblasting of the substrate. The degreasing mixture is the product Eurosorb, for example that is available from Eurotec Vetriebsgesellschaft mbH.

Moreover, the invention teaches that the solution to the technical problem is a cleaning cloth for removing grease, oils, and similar hydrophobic components from surfaces that are preferably contaminated with grease, oils, or the like, and the cleaning cloth has at least one cloth layer made of a fiber material and this cloth layer contains the degreasing mixture. The cloth layer is preferably a textile. For example, the textile is a fabric, a fleece, a paper, a felt, a microfiber, etc. The textile preferably comprises a multiplicity of fibers, for example tubular fibers. It is possible that the degreasing mixture is contained in at least one part of the fibers, preferably the tubular fibers.

According to one embodiment, a hollow space in the tubular fibers is filled with the degreasing mixture at least partially and, for example completely or substantially completely. Advantageously, an outer surface or a surface of the tubular fibers facing away from the hollow space is coated with the degreasing mixture to a partial extent and preferably completely or substantially completely. Advantageously, an inner or hollow-space-facing surface of the tubular fibers is advantageously coated with the degreasing mixture at least partially and, particularly preferably, completely or substantially completely. According to one embodiment, the outer surface and/or the surface facing the hollow space is coated with the degreasing mixture and/or the hollow space of the tubular fibers is at least partially filled with the degreasing mixture. It is possible that the cleaning cloth is designed as a two-layer cleaning cloth, and the degreasing mixture is between a lower layer of cloth and an upper layer of cloth. In other words, according to a preferred embodiment, the cleaning cloth has a sandwich structure in which the layers are in the sequence "layer of cloth/degreasing mixture/layer of cloth". The cleaning cloth is a disposable cloth, for example. It is possible that the cleaning cloth is a roll of cleaning cloths. The preferably contaminated surface of the substrate is, for example a metal surface, a plastic surface, a textile surface, or human skin.

Moreover, the invention teaches that another solution to the technical problem is a cleaning pen for removing grease, oils, and similar hydrophobic components of a contaminated surface of a substrate, and the cleaning pen has a grip and an applicator containing a degreasing mixture. The grip is dimensioned such that it can be held by a person. The applicator is a wand, for example that contains the degreasing mixture at least on the end thereof facing away from the grip or on a free end. Advantageously, the contaminated surface is treated with the cleaning pen by pressing the applicator containing the degreasing mixture to the contaminated surface. Basically it is possible for the applicator to be designed as a rotary body. Advantageously, the cleaning pen comprises a reservoir, and the rotary body is preferably coated with the degreasing mixture held in the reservoir. When the rotary body is rotated, the degreasing mixture applied to the rotary body is advantageously transferred to the contaminated surface. The contaminated surface is a textile, for example. Advantageously, the applicator provided with the degreasing mixture takes up the oil or grease or the hydrophobic component.

It is possible to apply the degreasing mixture for removing oils, grease, or similar hydrophobic components to a surface of a substrate, for example by spraying. According to one embodiment, the degreasing mixture is applied to the surface of a substrate by dipping at least the surface of the substrate and, preferably, the entire substrate or substantially the entire substrate into the degreasing mixture. It is recommended that the degreasing mixture is applied to the preferably contaminated surface of the substrate by irrigation, for example, wherein, preferably, a rapid relative movement is induced between the substrate or the surface of the substrate and the degreasing mixture.

Optionally, the substrate, which is preferably coated with the degreasing mixture, is supported in a vibrating or pneumatic manner while the degreasing mixture is applied to the surface in order to ensure that there is rapid relative movement between the degreasing mixture and the surface of the substrate. According to an advantageous embodiment, the substrate having the preferably contaminated surface is held in a drum into which the degreasing mixture is added. The drum is rotated in order to distribute the preferably free-flowing degreasing mixture uniformly or substantially uniformly to the preferably contaminated surface of the substrate.

It lies within the scope of the invention that an additive used for sandblasting is added to the degreasing mixture, and the mixture of the additive and the degreasing mixture is used to sandblast the surface and to remove grease, oils, or similar hydrophobic components from the surface. Preferably, only the degreasing mixture is applied to the surface. Preferably, the degreasing mixture is pressed onto the surface of the substrate.

According to one embodiment, the degreasing mixture is applied to the surface of a substrate by rolling and/or by pad pressure. In general, the degreasing mixture according to the invention can also be applied by subjecting the substrate and, optionally, the mixture per se to an electrostatic charge.

The saturated powder or the degreasing mixture can be subsequently blown off, brushed off, wiped off, suctioned off, etc., depending on the requirements, by an application of a stream of ionized air. It has proven to be advantageous to dip the substrate, with the surface contaminated with the oil or grease, into the degreasing mixture. According to a preferred embodiment, the degreasing mixture is electrostatically charged and is applied to a preferably grounded substrate surface. According to another embodiment, the degreasing mixture is preferably fluidized by introducing a gas into the degreasing mixture and is applied by a fluidized bed process to the contaminated surface of the substrate to be treated.

According to one embodiment, first, the substrate is advantageously created in a first processing step by pressing, punching, drilling, and/or reshaping, and, in a second step downstream of the first processing step, the degreasing mixture is applied to at least one surface of the substrate by a tool. After adsorption of the oils, grease, or similar hydrophobic components present on the substrate surface, in particular in the pores of the silicate mixture of the degreasing mixture, the degreasing mixture is removed from the surface of the substrate.

Basically, it is possible to support the application of the degreasing mixture onto the substrate surface by additional, preferably mechanical measures. For example, it is possible to provide a brush that applies the degreasing mixture to the substrate surface uniformly onto the substrate surface. According to one embodiment, the degreasing mixture can be applied and distributed on the substrate surface exclusively by the brush.

It is recommended that the degreasing mixture loaded with grease and/or oils be removed from the substrate surface and then fed to a treatment unit. In the treatment unit, the components accommodated in the pores of the degreasing mixture are removed, for example. It is possible that the degreasing mixture in the form of dry powder can be fed into the circulation, and, advantageously, only and exclusively those granules of the degreasing mixture that are saturated with hydrophobic components are withdrawn. As a result, depending on the cycle, only a small portion of the degreasing mixture contaminated with the hydrophobic impurities is replaced with pristine degreasing mixtures that have not yet come into contact with the substrate surface.

The invention is based on the discovery that the degreasing mixture according to the invention, which is usually in the form of a dry powder, is characterized by high efficacy in removing grease, oils, or similar hydrophobic components from a surface of a substrate. The degreasing machine according to the invention is characterized by favorable adsorption kinetics for grease, oils, and the like, which is why, surprisingly, short exposure times of the degreasing mixture on the substrate surface are sufficient for removing all the grease and oil. It has proven to be particularly advantageous that the degreasing mixture according to the invention is solvent-free. As a result, the treatment of the degreasing mixture according to the invention and the disposal of a degreasing mixture that is no longer usable, for example is loaded with hydrophobic components, is characterized by being easy to carry out. In other words, the complex treatment of a solvent contaminated with the grease and/or oils present on the surface of the substrate is avoided.

Particularly advantageously, it is surprisingly easy to apply the degreasing mixture according to the invention to a surface of a substrate to be treated. All that is needed for this is a pressing tool, for example that is used to apply the degreasing mixture to the surface of the substrate to be treated. The degreasing mixture makes it possible to avoid the use of spraying that is complex and produces dust. The use of the described pressing tool also makes continuous treatment possible, without an interruption in the process. Moreover, the degreasing mixture according to the invention can be optimally adjusted with respect to the components on the substrate surface to be removed, for example by adjusting and/or activating the pores of the degreasing mixture.

BRIEF DESCRIPTION OF THE DRAWING

The invention is further described in the following with reference to a drawing that schematically shows a single embodiment. Therein:

FIG. 1A shows a pen holding the degreasing mixture according to the invention for removing oils, grease, and similar hydrophobic components from textiles, FIG. 1B shows the pen according to FIG. 1A without the protective sleeve, FIG. 2 is a section through a cleaning cloth according to the invention holding the degreasing mixture according to the invention.

SPECIFIC DESCRIPTION OF THE INVENTION

Figure 3:
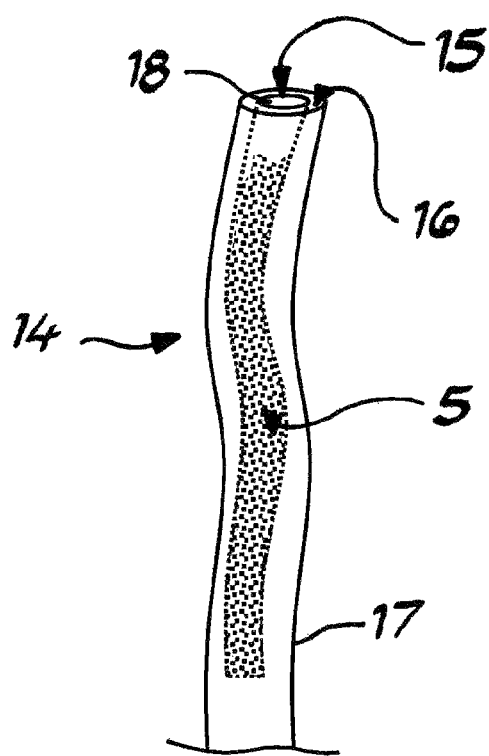
FIG. 3 is a perspective view of a first embodiment of a tubular fiber according to the invention.

FIGS. 1A and 1B show a cleaning pen 1 for removing oils, grease, and similar hydrophobic components from textiles. The cleaning pen 1 has a grip or handle 2 from which extends an applicator designed as a wand 3. FIG. 1A shows the cleaning pen 1 with the wand 3 is protected from damage by a protective sleeve 4. In addition to the wand 3, the protective sleeve 4 contains a mass 5 of granular degreasing mixture, so that the degreasing mixture is applied to an outer application end 6 of the wand 3.

FIG. 1B shows the cleaning pen 1 with the protective sleeve 4 removed as compared to FIG. 1A. It is evident that the wand 3 is coated with the degreasing mixture 5 on the application end 6, i.e. on the outer end of the wand 3 remote from the handle 2. When the application end 6 is pressed onto an unillustrated textile, the contamination of oils and/or grease contained in the textile is taken up by the degreasing mixture 5.

FIG. 2 shows a cleaning cloth 7 according to the invention that has two layers of cloth 8 and 9. A layer 10 of the degreasing mixture 5 is held between the cloth layers 8 and 9. FIG. 2 clearly shows that the cleaning cloth forms pockets 11, 12, and 13 that are separated from one another in order to prevent uncontrolled shifting of the degreasing mixture 5 in the cleaning cloth 7. When the cleaning cloth 7 is wiped over a surface not shown in FIG. 2 contaminated with grease, oils, or similar hydrophobic contaminants, the contaminants migrate into the pores of the degreasing mixture 5 [of the cloths 8 and 9] and are thereby removed from the surface.

Figure 4:
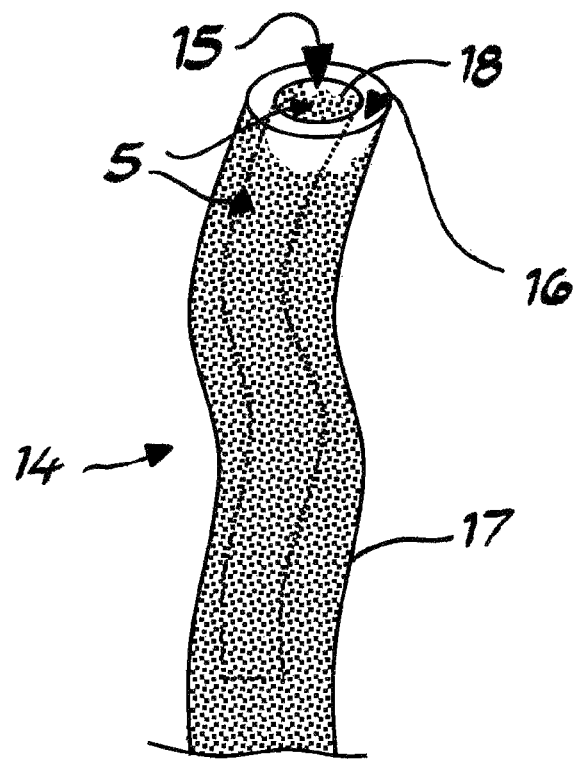
FIG. 4 is a longitudinal view of a second embodiment of a tubular fiber according to the invention.

FIG. 3 shows a tubular fiber 14 whose interior 15 is partially filled with the degreasing mixture 5. According to the embodiment, a wall 16 of the tubular fiber 14 is made of a thermoplastic plastic. FIG. 4 shows a second embodiment of the tubular fiber 14. An outer surface 17 and an inner surface 18 of the tubular fiber 14 that delimits the interior 15 are both coated with the degreasing mixture 5.

The invention claimed is:

1. A degreasing mixture for removing grease, oils, or similar hydrophobic components from a surface of a substrate, said degreasing mixture consisting essentially of:
   greater than 50% by mass of the degreasing mixture of a solvent-free main component consisting of granules of calcium bentonite activated with sodium carbonate and granules of tectosilicate, wherein
   up to 90% by mass of the granules contained in the mixture have a particle size of less than 60 μm, and the maximum particle size of the granules of calcium bentonite is smaller than the maximum particle size of the granules of tectosilicate.

2. The degreasing mixture according to claim 1, wherein the degreasing mixture contains at least 90% by mass of the main component and an adsorbing agent.

3. The degreasing mixture according to claim 1, wherein the granules of calcium bentonite have a maximum particle size of 25 μm to 65 μm.

4. The degreasing mixture according to claim 3, wherein the granules of tectosilicate have a maximum particle size of at least 55 μm.

5. The degreasing mixture according to claim 1, wherein more than 50% by mass of the granules contained in the main component have a particle size greater than 20 μm.

6. The degreasing mixture according to claim 1, wherein the calcium bentonite content of the main component is greater by a factor 1.1 to 2 than the tectosilicate content of the main component.

7. The degreasing mixture according to claim 1, wherein the main component contains 20 to 60% by mass of the granules of tectosilicate and 40 to 80% by mass of the granules of calcium bentonite.

8. The degreasing mixture according to claim 1, wherein the calcium bentonite is a three-layer phyllosilicate capable of swelling, and at least one component selected from the group consisting of zeolites is the main component of the granules of tectosilicate.

9. A cleaning pen for removing grease, oils, or similar hydrophobic components from a surface of a substrate, wherein the cleaning pen has a grip and an applicator containing a degreasing mixture according to claim 1.

10. A cleaning cloth for removing grease, oils, or similar hydrophobic components from a surface of a substrate, wherein the cleaning cloth has at least one layer of cloth made of a fibrous material, and the layer of cloth contains a degreasing mixture according to claim 1.

11. A tubular fiber for removing grease, oils, or similar hydrophobic components from a surface of a substrate, wherein a hollow space of the tubular fiber is at least partially filled with a degreasing mixture according to claim 1, and/or wherein an outer surface and/or an inner surface of the tubular fiber is at least partially coated with a degreasing mixture according to claim 1.

12. A degreasing mixture consisting essentially of:
   0% by mass solvent;
   greater than 50% by mass of the degreasing mixture of a main component consisting of up to 90% by mass granules of calcium bentonite activated with sodium carbonate of a predetermined maximum particle size; and
   up to 10% by mass of tectosilicate granules having a predetermined maximum particle size smaller than the predetermined particle size of the calcium bentonite granules; wherein up to 90% by mass of the calcium bentonite and tectsosilicate granules have a particle size of less than 60 μm.

* * * * *